United States Patent [19]

Lindquist

[11] 4,114,741
[45] Sep. 19, 1978

[54] FABRICATED PRESSURE PLATE

[75] Inventor: Terry Kent Lindquist, Troy, Mich.

[73] Assignee: Borg-Warner Corporation, Chicago, Ill.

[21] Appl. No.: 754,383

[22] Filed: Dec. 27, 1976

[51] Int. Cl.² .................. F16D 13/70; F16D 13/72
[52] U.S. Cl. .................................. 192/89 B; 29/455 R; 29/509; 29/513; 192/107 R; 192/113 A; 228/173 C; 228/182
[58] Field of Search ............... 192/70.27, 89 B, 107 R, 192/113 A; 188/73.2, 218 XL; 29/509, 513, 526, 455 R; 228/173 C, 182

[56] References Cited

U.S. PATENT DOCUMENTS

| 2,217,078 | 10/1940 | Reed | 192/68 |
|---|---|---|---|
| 2,885,047 | 5/1959 | Kehrl | 192/70.27 X |
| 2,902,130 | 9/1954 | Halberg et al. | 192/107 |
| 3,144,204 | 8/1964 | Bohanon | 29/513 |
| 3,265,349 | 8/1966 | Hamrick | 29/513 X |
| 3,410,382 | 11/1968 | Root et al. | 192/107 |
| 3,479,731 | 11/1969 | Mantel et al. | 228/182 |
| 3,548,988 | 12/1970 | Armstrong | 192/107 |
| 3,603,438 | 9/1971 | Hashizume | 192/107 C |
| 3,635,320 | 1/1972 | Capanna | 192/107 M |
| 3,712,435 | 1/1973 | Kraus | 192/113 A X |
| 4,020,937 | 5/1977 | Winter | 192/113 A X |

*Primary Examiner*—Allan D. Herrmann
*Attorney, Agent, or Firm*—James A. Geppert

[57] ABSTRACT

A lightweight low-cost pressure plate for use in a friction clutch assembly that is fabricated of sheet metal stampings and includes an annular U-shaped member providing a friction surface, the U-shaped member opening on the side opposite the friction surface to receive one or more diagonally or radially oriented stiffening members that provide a fulcrum edge for a Belleville spring acting to bias the clutch assembly into the clutch engaged position.

24 Claims, 12 Drawing Figures

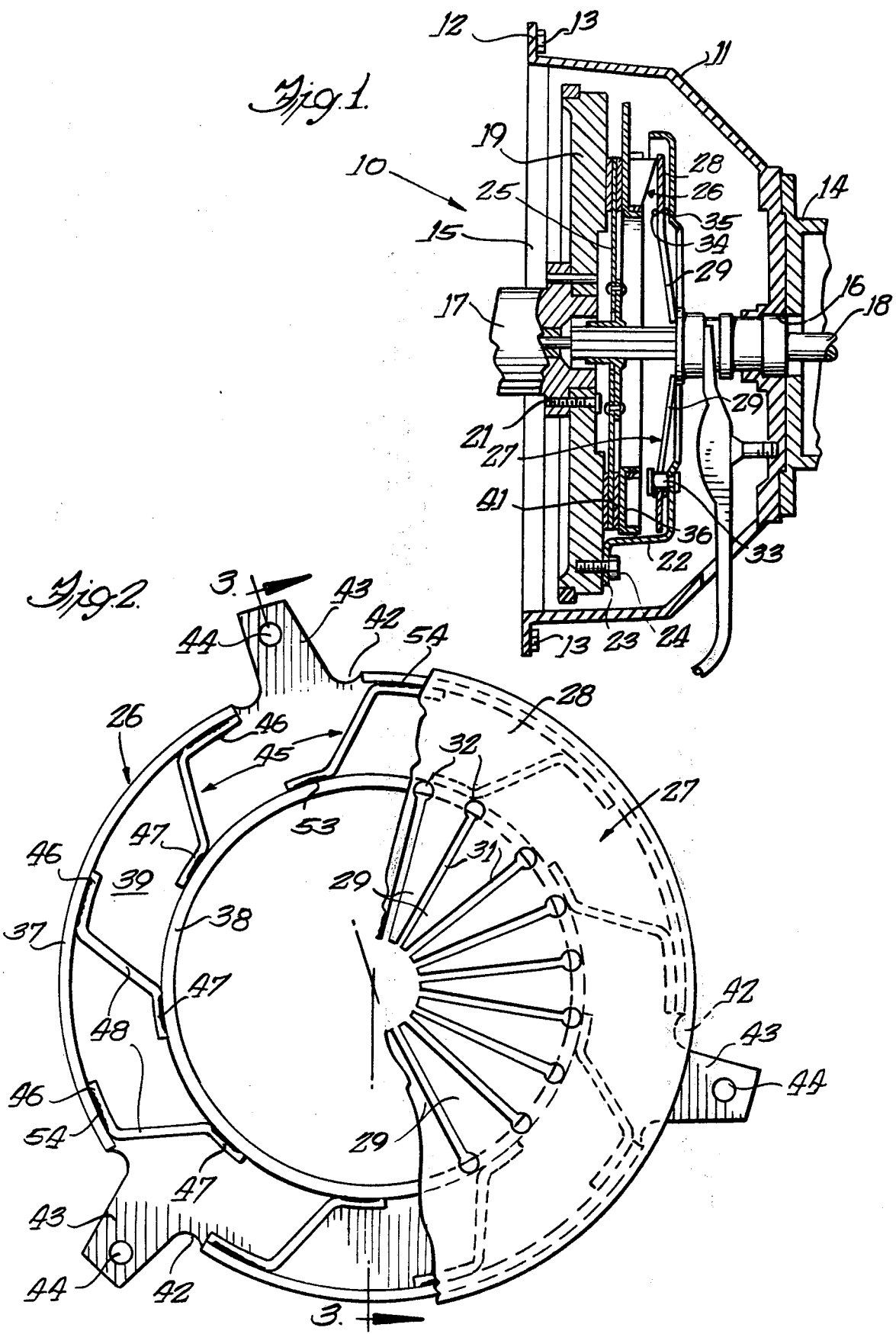

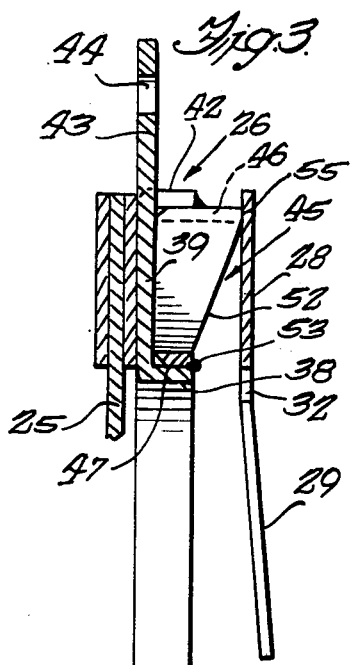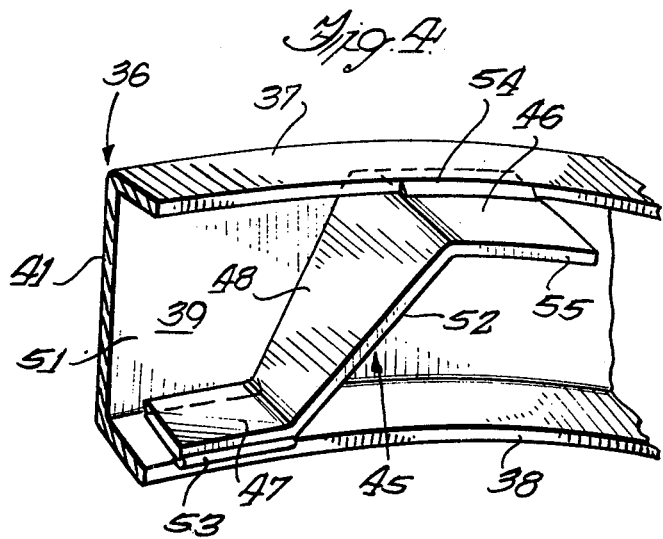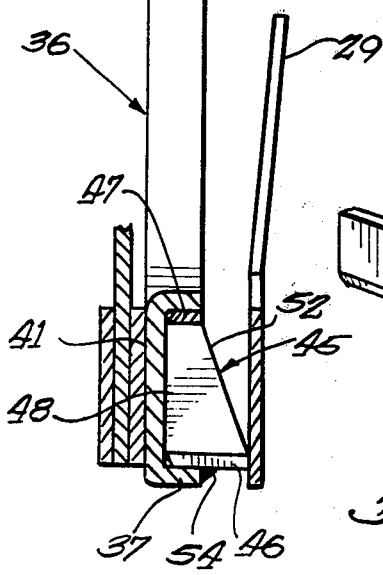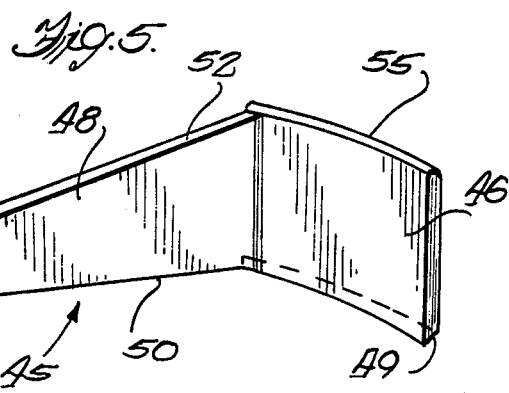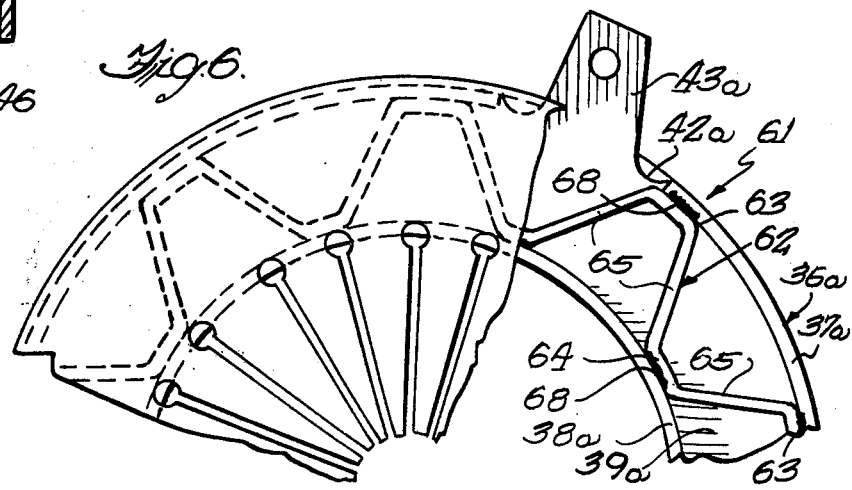

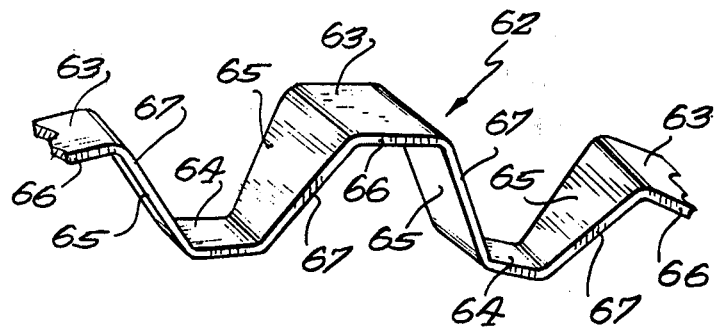
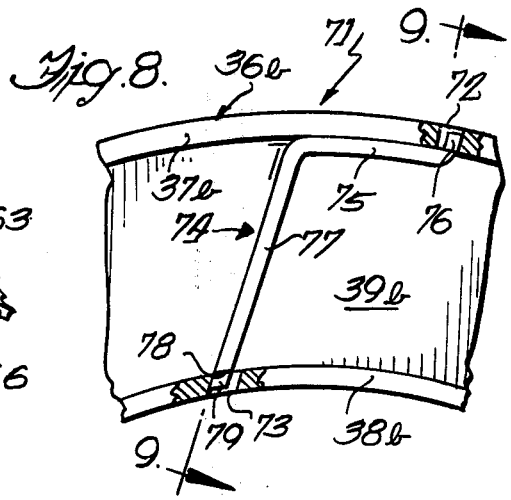
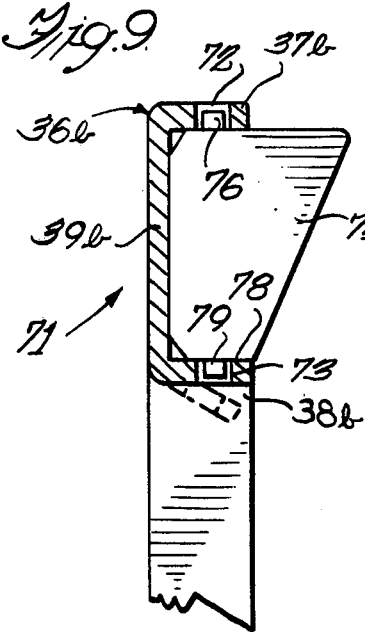
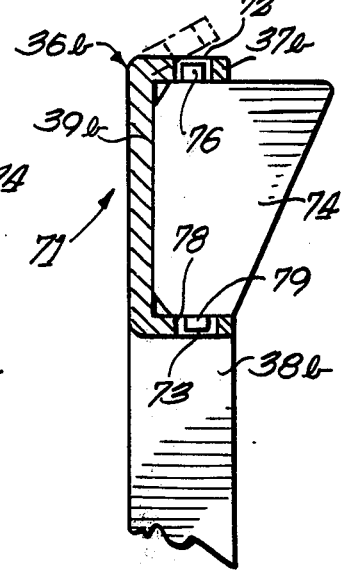
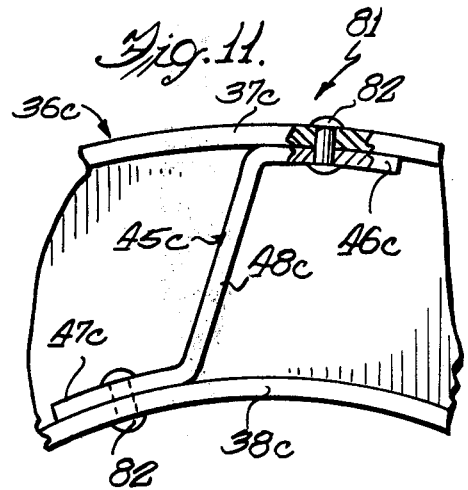
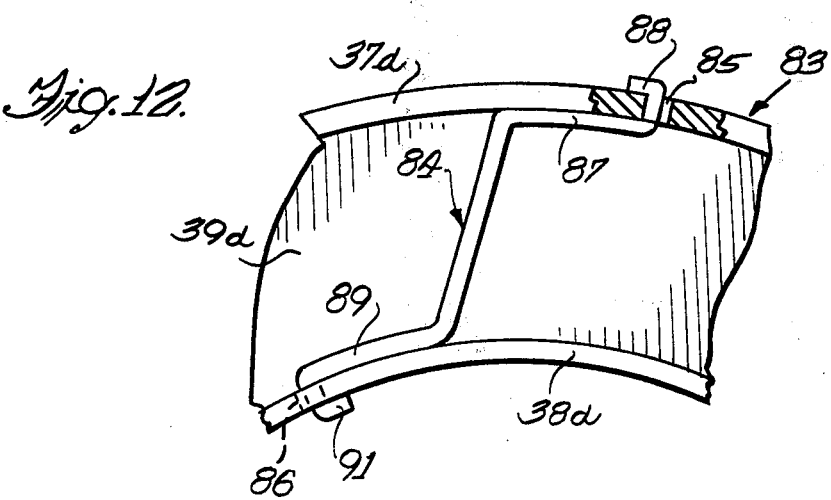

FABRICATED PRESSURE PLATE

BACKGROUND AND SUMMARY OF THE INVENTION

The conventional clutch pressure plate utilized in an automotive or other vehicle has almost always been manufactured of cast iron which, because of its excellent wear and thermal qualities, has done a good job. However, in view of the move to smaller cars with high speed engines, objections have been raised to the continued use of cast iron for the pressure plate for the reasons of the high cost of casting, high cost of machining, rejections for poor quality, and lack of strength to resist bursting at high engine r.p.m. due to centrifugal force. The present invention relates to a fabricated clutch pressure plate that will obviate the problems inherent in foundry castings.

The present invention relates to a novel clutch pressure plate which is fabricated from several stampings, all of which could be produced from strip sheet by the well known progressive die method where strip steel is fed in one end of a press and finished stampings are ejected at the other end. The pressure plate consists of a single annular U-shaped member and one or more diagonally or radially oriented stiffening members received within the open side of the U-shaped member. The stiffening members are suitably secured within the U-shaped member by mechanical means or by brazing or welding.

The present invention also comprehends the provision of a fabricated pressure plate utilizing an annular generally U-shaped member having inner and outer peripheral flanges joined by a base portion or friction surface, and a plurality of generally S-shaped small members are equally spaced around and fit within the open side of the U-shaped member closely fitting the inner, outer and bottom surfaces thereof. Each small member has a relatively narrow inner end and a relatively wide outer end; the outer end projecting above the outer flange of the annular member. The outer ends can be coined before or after assembly to provide a suitable fulcrum surface for a Belleville spring in the final clutch assembly, or the ends are machined after assembly in the annular member.

The present invention also comprehends the provision of a fabricated pressure plate formed of an annular member that is generally U-shaped in cross section and has inner and outer peripheral flanges joined by a base portion and a unitary stiffening member having a generally sinusoidal configuration and annular in form to fit within the peripheral flanges of the annular member. The stiffening member has high portions engaging the outer flange and low portions engaging the inner flange and joined by diagonally or radially oriented inclined intermediate portions. The stiffening member is joined to the flanges by a suitable mechanical securing means or brazing or welding.

The present invention further comprehends a fabricated pressure plate of low weight, high strength, consistent quality and low cost. The plurality of small members or single sinusoidal member in the annular member act to stiffen the annular member and provide air circulation for cooling of the pressure plate and surrounding assembly. The stiffening member or members may also provide additional heat sink and thermal transfer surfaces.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a vertical cross sectional view of an automotive vehicle clutch assembly utilizing the fabricated clutch pressure plate of the present invention.

FIG. 2 is an elevational view of the fabricated clutch pressure plate and clutch spring taken from the right-hand side of FIG. 3 with the spring partially broken away.

FIG. 3 is a vertical cross sectional view of the fabricated pressure plate and spring taken on the line 3—3 of FIG. 2.

FIG. 4 is an enlarged partial perspective view of the pressure plate showing a portion of the plate and a stiffening member.

FIG. 5 is an enlarged perspective view of a stiffening member.

FIG. 6 is a partial elevational view of an alternate clutch pressure plate with the spring partially broken away.

FIG. 7 is a partial perspective view of the stiffening member of FIG. 6.

FIG. 8 is a partial elevational view of a clutch pressure plate having a third embodiment of stiffening member.

FIG. 9 is a cross sectional view of the pressure plate taken on the irregular line 9—9 of FIG. 8 to show the method of assembly.

FIG. 10 is a cross sectional view similar to FIG. 9 but showing an alternate mode of assembly.

FIG. 11 is a partial elevational view partly in cross section of a clutch pressure plate showing a further method of assembly of the stiffening members.

FIG. 12 is a partial elevational view partly in cross section showing a further fastening means for the assembly.

DESCRIPTION OF THE PREFERRED EMBODIMENTS

Referring more particularly to the disclosure in the drawings wherein are shown illustrative embodiments of the present invention, FIG. 1 discloses an automotive clutch assembly 10 interposed between the engine and the transmission of a vehicle. The clutch assembly includes a clutch housing 11 having a radial flange 12 secured by suitable fastening means 13 to the engine (not shown) and abutting the transmission housing 14, the housing having coaxial opposed openings 15 and 16 for receiving an engine crankshaft 17 and a transmission or driven shaft 18.

Within the housing 11, the clutch assembly 10 includes a flywheel 19 secured to the crankshaft 17 by suitable fastening means 21, an inner clutch cover 22 having a radial flange 23 secured to the flywheel 19 by bolts 24, a clutch disc 25, a pressure plate 26, and a spring plate or Belleville spring 27. The Belleville spring has an outer conical portion 28 and a plurality of inwardly extending spring fingers 29 separated by slots 31 (FIG. 2). At least some of the slots have enlarged inner ends 32 to receive a plurality of circumferentially spaced rivets 33, and a pair of wire rings 34, 35 (FIG. 1) act as fulcrum surfaces for pivotal movement of the spring.

The pressure plate 26 for the clutch, shown in more detail in FIGS. 2, 3 and 4, is fabricated from sheet metal stampings formed in a progressive die or other suitable stamping method and includes an annular generally U-shaped member 36 and a plurality of stiffening members 45. The annular member 36 includes an outer peripheral flange 37 and an inner peripheral flange 38 joined by a base portion or web 39 providing a friction surface 41 facing the clutch disc 25. The flange 37 is provided with three circumferentially equally spaced openings or slots 42 from which project radial drive lugs 43 formed in substantially the same plane as the base portion 39. Each lug has an opening 44 to receive suitable securing means to attach the lug to a drive strap (not shown) which in turn is attached to the cover member 22 in the usual manner.

Positioned at substantially equal intervals within the open side of the annular member 36 are a plurality of stiffening members or vanes 45 (FIGS. 4 and 5) of a generally S-shape, each of which includes an outer curved end 46 and an inner curved end 47 joined by an inclined intermediate portion 48. As clearly shown in FIG. 4, the inner end 47 is of a width substantially equal to the height of the inner flange 38, and the outer end 46 is of a considerably greater width so as to project beyond the outer flange 37; both ends having chamfered inner edges 49. The intermediate connecting portion 48 has a flat edge 50 adapted to engage the inner surface 51 of the base portion 39 and an inclined edge 52 joining the inner and outer ends 47, 46 of different widths or heights.

The inner and outer ends 47, 46 are curved to correspond to the curvatures of the inner and outer flanges 38, 37, respectively. Thus, in assembly, the stiffening members 45 are suitably positioned within the open side of the annular member 36 and firmly attached to the flanges at 53 and 54 by brazing or by spot, arc or other welding methods. Being firmly attached, the members 45 (shown as nine in number) provide secondary surfaces such that much of the heat generated on the friction surface 41 quickly flows to the secondary surfaces where it is carried off by movement of air. After attaching, the outermost top edge 55 of the outer end 46 of each member is machined to a uniform height and with a radius to provide a fulcrum surface adapted to be engaged by the outer portion of the Belleville spring 27.

As an alternative to the machining operation of the edge 55, the members 45 could be coined in a press operation either before or after assembly to produce the radius and height uniformity. Due to the inherent stiffness of the U-shaped annular member 36 further stiffened by the diagonal members 45, the friction surface 41 will be sufficiently flat so as to eliminate the need for a finishing operation on this surface. Thus, a pressure plate is provided having a low weight, high strength, consistent quality and low cost. Although nine diagonal members are shown, other sizes of pressure plates obviously may have more or fewer pieces.

FIG. 6 discloses an alternate construction of pressure plate 61 utilizing a one-pice stiffening member 62; wherein like elements will have the same reference numerals with a script *a*. The pressure plate 61 includes an annular member 36*a* having a generally U-shape in cross section, with an outer peripheral flange 37*a*, and an inner flange 38*a* joined by a base portion or web 39*a*. Radial drive lugs 43*a* extend radially from slots 42*a* in the flange 37*a*. The stiffening member 62 (see FIG. 7) has a generally sinusoidal shape formed into a ring and having high arcuate portions 63 alternating with low arcuate portions 64 and joined by diagonal intermediate portions 65. The low portions 64 have substantially the same height as and engage the inner flange 38*a*, while the high portions 63 engage the outer flange 37*a* but are of a greater height to provide an intermittent rounded fulcrum edge 66. The intermediate portions 65 have inclined edges 67 moving from a high portion to the next adjacent low portion and then to the next high portion.

The stiffening member 62 is inserted into the open side of the annular member 36*a* to completely fill the full circle of the plate and is suitably joined thereto. As shown in FIG. 6, the member 62 may be joined to the inner and outer flanges 38*a* and 37*a*, respectively, by welding or brazing at 68. Brazing would be desirable to provide an increase in the heat transfer from the plate to the vanes formed by the intermediate portions 65. Mechanical means, such as rivets, would also be appropriate to secure the high and low portions to the outer and inner flanges, respectively.

FIGS. 8 through 10 disclose another embodiment for use in a clutch pressure plate 71, with like elements having the same reference numeral with a script *b*. The annular member 36*b* has an outer flange 37*b* and an inner flange 38*b* connected by a base portion or web 39*b* and is provided with drive lugs (not shown). The outer flange 37*b* is provided with a plurality of circumferentially spaced openings 72 and the inner flange likewise has a plurality of circumferentially spaced openings 73 formed therein.

A plurality of stiffening members 74 are positioned at substantially equal intervals in the number 36*a*, with each member 74 having a curved outer end portion 75 engaging the outer flange 37*b* and terminating in a tab 76 bent outwardly to project through an opening 72. A diagonal stiffening portion 77 extends across the web 39*b* from the outer end portion 75 to terminate in a edge 78 contacting the inner flange 38*b* and having a tab 79 projecting through an opening 73 in this flange.

To assemble this plate structure, the annular member 36*b* is stamped with a fully bent outer flange 37*b* and a partially formed inner flange 38*b* shown in dotted lines in FIG. 9. The members 74 are positioned with the tabs 76 inserted into the openings 72 and the tabs 79 are located at the openings 73 in the partially formed flange 38*b*. The inner flange 38*b* is then rolled to be square to the web 39*b* as the final operation which locks all of the stiffening members in place. Likewise, as shown in FIG. 10, the outer flange 37*b* could be rolled to secure the tabs 76 once the stiffening members 74 are positioned in the plate 36*b* with tabs 79 located on the formed inner flange 38*b*.

FIG. 11 discloses a further embodiment of clutch pressure plate 81 showing another means of fastening stiffening members in place, with like members having the same reference numerals with a script *c*. The stiffening members 45*c* are substantially identical to those of the first embodiment, having a generally S-shape with curved outer ends 46*c* and curved inner ends 47*c* joined by an inclined intermediate portion 48*c*. The inner ends 47*c* engage the inner flange 38*c* of the annular member 36*c* and the outer ends 46*c* engage the outer flange 37*c*, and the ends have the same relative heights as disclosed for previous embodiments. Both the inner and outer ends are secured to the flanges by rivets 82 to position the members at circumferentially spaced intervals around the pressure plate. Obviously, rivets can also be used as a securing means for the continuous stiffening members shown in FIGS. 6 and 7.

FIG. 12 discloses a further means of securing a stiffening members 84 in a pressure plate 83. This embodiment is generally similar to that shown in FIGS. 8–10 in that the outer flange 37d has a plurality of circumferentially spaced slots 85 and the inner flange 38d has a plurality of circumferentially spaced slots 86. Each stiffening member 84, has a curved outer end 87 terminating in an elongated tab 88 projecting through and beyond a slot 85, and the inner end 89 of the member terminates in a tab 91 projecting through and beyond the slot 85.

The stiffening members 84 are assembled in the same manner as for the structure of FIGS. 8–10; however, not only is the inner or outer flange rolled square to the web 39d, but the inner surface of flange 38d and the outer surface of outer flange 37d are rolled to bend over and lock the tabs 88, 91 onto the flanges of the pressure plate. Here again, this fastening arrangement is equally adapted to the stiffening members of FIGS. 8 through 10 or the unitary member of FIGS. 6 and 7 wherein suitable tabs are formed on either of these members to interlock with the flanges of the pressure plate.

Although diagonally oriented stiffening members are shown and described, the stiffening members may also be radially oriented in the annular member, and while stiffening members or vanes of a particular and effective shape have been shown and described by way of illustration, it is not my intent or desire to unnecessarily restrict the improved features of the present invention by virtue of this limited showing.

I claim:

1. A fabricated clutch pressure plate comprising an annular generally U-shaped member having inner and outer peripheral flanges joined by a base portion and at least one stiffening member secured within the flanges to provide a discontinuous fulcrum surface.

2. A fabricated clutch pressure plate as set forth in claim 1, in which said stiffening member comprises a plurality of generally S-shaped members, each having an outer end, an inner end, and an inclined intermediate portion.

3. A fabricated clutch pressure plate as set forth in claim 2, in which said inner and outer ends of each stiffening member are curved complementary to the inner and outer flanges, respectively, of said annular member so as to be secured thereto.

4. A fabricated clutch pressure plate as set forth in claim 3, in which the width of said inner end corresponds to the height of said inner flange, the width of said outer end exceeds the height of said outer flange, and said intermediate portion has an inclined edge connecting the outer edges of said inner and outer ends.

5. A fabricated clutch pressure plate as set forth in claim 4, in which the outer edge of each outer end is machined to a common height and rounded to form a fulcrum surface for a clutch diaphragm spring.

6. A fabricated clutch pressure plate as set forth in claim 3, in which said inner and outer ends of the stiffening members are welded to the inner and outer flanges of said annular member.

7. A fabricated clutch pressure plate as set forth in claim 3, in which said stiffening members engage the interior surfaces of said inner and outer flanges and said base portion, the outer surface of said base portion forming a friction surface for a clutch.

8. A fabricated clutch pressure plate as set forth in claim 1, including circumferentially equally spaced drive lugs integral with and formed in substantially the same plane as the base portion.

9. A fabricated clutch pressure plate as set forth in claim 1, in which said stiffening member comprises a unitary member of a generally sinusoidal configuration and generally circular in form to be received within said annular member.

10. A fabricated clutch pressure plate as set forth in claim 9, in which said unitary stiffening member includes a plurality of high portions contacting the outer flange and a plurality of low portions contacting the inner flange joined by diagonal intermediate members connecting the high and low portions.

11. A fabricated clutch pressure plate as set forth in claim 10, in which the high portions project above the outer flange and form the fulcrum surface.

12. A fabricated clutch pressure plate as set forth in claim 11, in which said inner and outer flanges are provided with a plurality of circumferentially spaced slots, and said stiffening member has outwardly projecting tabs integral with said high and low portions extending into the slots.

13. A fabricated clutch pressure plate as set forth in claim 12, in which said tabs project beyond the flanges and are rolled over to lock the members together.

14. A fabricated clutch pressure plate as set forth in claim 1, in which said stiffening member is secured to the inner and outer flanges by welding.

15. A fabricated clutch pressure plate as set forth in claim 1, in which said stiffening member is secured to the inner and outer flanges by brazing.

16. A fabricated clutch pressure plate as set forth in claim 1, in which said stiffening member is secured to the inner and outer flanges by rivets.

17. A fabricated clutch pressure plate as set forth in claim 1, in which said stiffening member comprises a plurality of generally L-shaped members, each having an inner edge, an outer curved end portion and an inclined intermediate portion, said inner edge terminating in a tab and said outer end portion terminating in an outwardly extending tab, said inner and outer flanges having a plurality of circumferentially spaced slots receiving said tabs.

18. A method of forming a clutch pressure plate comprising the steps of stamping an annular generally U-shaped member, said member having inner and outer circular flanges joined by a friction surface, stamping at least one stiffening member, inserting said stiffening member within said annular member, securing said stiffening member to said annular member, and forming the outer edge of said stiffening member into a discontinuous fulcrum surface.

19. The method as set forth in claim 18, including the step of forming radially extending integral drive lugs on said U-shaped member and lying in substantially the same plane as said friction surface.

20. The method as set forth in claim 18, in which said forming step comprises machining the outer edges of the stiffening members to a uniform height and radius for the fulcrum surface.

21. The method as set forth in claim 18, in which said forming step comprises coining the outer edges of the stiffening members to a uniform height and radius for the fulcrum surface.

22. A method of forming a clutch pressure plate comprising the steps of stamping an annular generally U- shaped member, said member having inner and outer circular flanges joined by a friction surface, stamping a plurality of generally S-shaped stiffening members, each having an outer curved end, an inner curved end and an intermediate inclined portion, inserting said stiffening members within said annular member, securing said stiffening members to said annular member, and forming the outer edges of said stiffening members into a fulcrum surface.

23. The method as set forth in claim 22, in which the curvaturs of the inner and outer ends of said stiffening members are complementary to the curvatures of the inner and outer flanges, respectively, and said stiffening members are secured in said annular member at generally equally spaced intervals.

24. A method of forming a clutch pressure plate comprising the steps of stamping an annular generally U-shaped member, said member having inner and outer circular flanges joined by a friction surface, stamping a unitary stiffening member having a sinusoidal configuration with a generally circular form to fit within said annular member, inserting said stiffening member within said annular member, securing said stiffening member to said annular member, and forming the outer edge of said stiffening member into a fulcrum surface.

* * * * *